United States Patent [19]
Andexlinger et al.

[11] Patent Number: 5,076,638
[45] Date of Patent: Dec. 31, 1991

[54] METHOD AND CORRESPONDING CONFIGURATION FOR FIXING A WINDOW GUIDE SECTION

[75] Inventors: Klaus Andexlinger, Bregenz, Austria; Klaus Dehnert, Lindau, Fed. Rep. of Germany; Per Jörgensen, Wasserburg, Fed. Rep. of Germany; Jürgen Kranz, Lindau/Bodolz, Fed. Rep. of Germany

[73] Assignee: Metzeler Automotive Profiles GmbH, Lindau, Fed. Rep. of Germany

[21] Appl. No.: 648,738

[22] Filed: Jan. 31, 1991

[30] Foreign Application Priority Data

May 17, 1990 [DE] Fed. Rep. of Germany ....... 4015928

[51] Int. Cl.$^5$ ................................................ B60J 5/04
[52] U.S. Cl. ................................. 296/201; 296/146; 49/374
[58] Field of Search ...................... 296/201, 202, 146; 49/374, 440, 441

[56] References Cited
FOREIGN PATENT DOCUMENTS 0182318 5/1986 European Pat. Off. .

*Primary Examiner*—Robert R. Song
*Attorney, Agent, or Firm*—Herbert L. Lerner; Laurence A. Greenberg

[57] ABSTRACT

A method for fixing a window guide section with a mounting to a metal frame, especially in the door of a motor vehicle, includes decoupling the metal frame from the mounting of the window guide section with an interposed intermediate system compensating for manufacturing tolerances and assuming the function of the mounting. The metal frame of the motor vehicle door has a rear surface and two outwardly-projecting webs with free ends. The window guide section has recesses of a given shape formed therein. A configuration for fixing the window guide section to the metal frame includes a rigid plastic section surrounding the rear surface of the metal frame. The plastic section extends beyond the free ends of the webs and at least partially surrounds the webs at a given location. The plastic section has laterally-projecting mounting projections with the given shape in the vicinity of the given location being buttoned into the recesses in the window guide section.

9 Claims, 1 Drawing Sheet

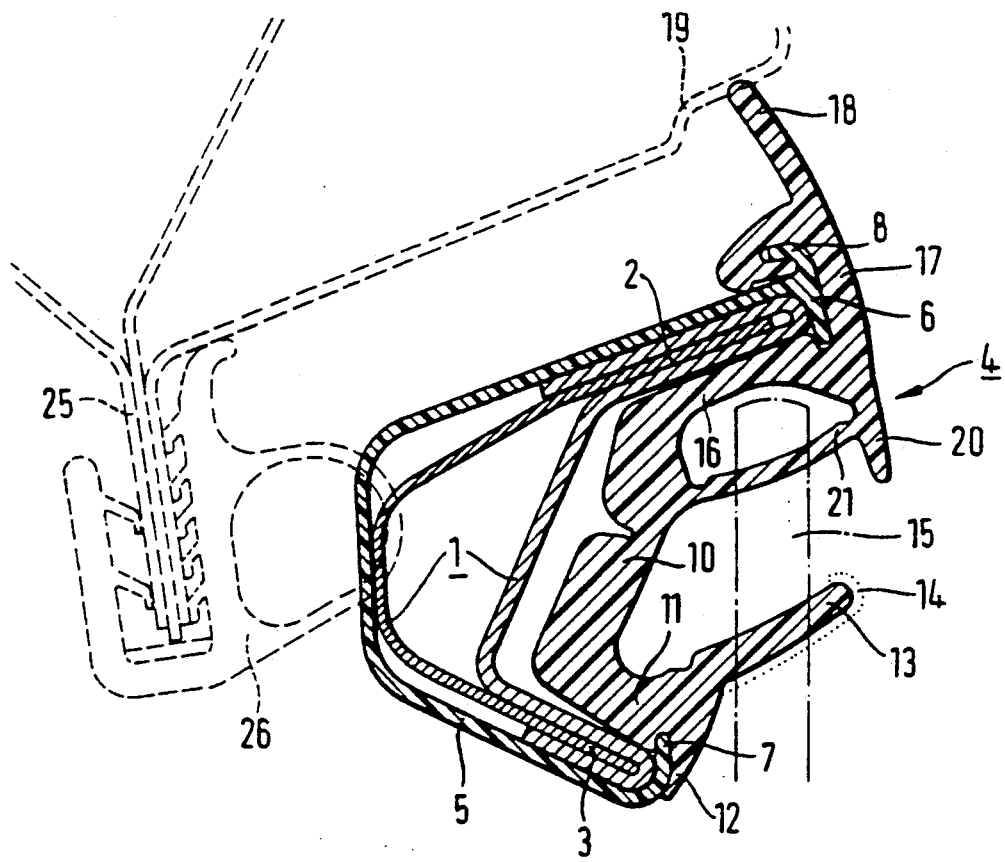

METHOD AND CORRESPONDING CONFIGURATION FOR FIXING A WINDOW GUIDE SECTION

The invention relates to a method and a configuration for fixing a window guide section to a metal frame, in particular in the door of a motor vehicle.

Such a window guide section and its corresponding mounting is known, for example, from Published European Application No. 0 182 318. In that device, the metal frame of the motor vehicle door surrounding the window opening is fitted with two webs which face outwardly and onto which the appropriately shaped window guide is fixed.

However, such means of attachment is prone to problems if the metal frame has large tolerances, so that the window guide can only be inadequately fixed or does not sit in the exact position with respect to the window and/or the metal frame.

It is accordingly an object of the invention to provide a method and corresponding configuration for fixing a window guide section, which overcome the hereinafore-mentioned disadvantages of the heretofore-known methods and devices of this general type and which securely and exactly fix the window guide section to the metal frame, even when adjustments in order to compensating for large tolerances are necessary.

With the foregoing and other objects in view there is provided, in accordance with the invention, a method for fixing a window guide section with a mounting to a metal frame, in particular in the door of a motor vehicle, which comprises decoupling the metal frame from the mounting of the window guide section with an interposed intermediate system simultaneously compensating for manufacturing tolerances and assuming the function of the mounting.

This then means that the window guide is not mounted directly on the metal frame and directly held by it, but rather that a system is inserted between the metal frame and the window guide which serves on one hand in order to compensate for tolerance deviations and which on the other hand assumes the function of mounting and fixing the window guide with appropriate connections to the metal frame.

With the objects of the invention in view there is also provided, in a motor vehicle door having a metal frame with a rear surface and two free, outwardly-projecting webs with free ends, and a window guide section with recesses of a given shape formed therein, a configuration for fixing the window guide section to the metal frame, comprising a rigid plastic section surrounding the rear surface of the metal frame, the plastic section extending beyond the free ends of the webs and at least partially surrounding the webs at a given location, and the plastic section having laterally-projecting mounting projections with the given shape in the vicinity of the given location being buttoned into the recesses in the window guide section.

In accordance with another feature of the invention, the plastic section is formed of ABS, that is of a tough acrylonitrile butadiene styrene, possibly with a fiberglass reinforcement, or of polyamide.

In accordance with a further feature of the invention, the plastic section has a practically U-shaped cross-section with inwardly bent projections at the free ends of the legs thereof which surround the webs of the metal frame.

In accordance with an added feature of the invention, at least one leg also has an outwardly projecting fitting strip for holding the window guide section.

In accordance with an additional feature of the invention, the the motor vehicle has a roof with a lower surface, the door has a window pane, the window guide section has an approximately U-shaped basic body having legs with free ends, the basic body is disposed between the webs of the metal frame, the free end of one of the legs has an outwardly projecting fitting strip surrounding one of the mounting projections of the plastic section and a sealing lip projecting inwardly at an angle towards the window pane, and the free end of the other of the legs has a profile region surrounding the other of the mounting projections and a sealing strip pressing against the lower surface of the roof.

In accordance with yet another feature of the invention, the free end of the other of the legs has a profiled fitting strip surrounding the window pane from the top and the outside, and the profiled strip has an outer surface flush with the sealing strip.

In accordance with a concomitant feature of the invention, in order to make fitting easier, the window guide section has a contraction in the vicinity of the bottom of the basic body to reduce its thickness and to serve as a pivot or separation point.

Other features which are considered as characteristic for the invention are set forth in the appended claims.

Although the invention is illustrated and described herein as embodied in a method and corresponding configuration for fixing a window guide section, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a fragmentary, diagrammatic, cross-sectional view of an upper area of a metal frame of a motor vehicle door below the vehicle roof.

Referring now to the single FIGURE of the drawing in detail, it is seen that the upper region of a motor vehicle door is equipped with a double-walled, hollow metal frame 1 with two outwardly-projecting webs or ridges 2 and 3. A window guide section or profile 4 has a mounting which is buttoned directly onto the metal frame 1 in the usual manner.

However, since such a mounting may be very inadequate with wide variations in manufacturing tolerances, a plastic section or profile 5 is inserted as described below in order to act as a tolerance compensating and mounting system, in accordance with the invention. The plastic section 5 has an approximately U-shaped cross-section and provides an interposed intermediate system for decoupling the metal frame 1 from the mounting of the window guide section 4.

The plastic section 5 surrounds the rear side of the metal frame 1 and the outwardly-projecting webs 2 and 3 and thereby extends beyond the ends of the webs 2 and 3, at which point the section 5 has inwardly-projecting projections 6 and 7. If required, an additional, outwardly-projecting contour or fitting strip or projection 8 may also be present. The projections 6, 7 and 8 are buttoned into corresponding recesses or openings in the window guide section 4.

The section 5 is advantageously formed of ABS, that is of acrylonitrile butadiene styrene which has a high degree of hardness and is therefore very fracture-resistant and will spring back when deformed. However, it is also possible to form the section of polyamide or another tough plastic material.

The actual window guide section 4 is connected to the metal frame 1 and the plastic section 5 in the manner described below.

The window guide section 4 has a nearly U-shaped basic body 10 which has legs 11, ,16 and which lies between the free webs 2 and 3 of the metal frame. At the end of one leg 11, of the basic body 10 is an outwardly-projecting fitting strip 12 which surrounds the mounting projection 7 of the section 5. In addition, a swinging or pivoting sealing lip 13 that extends from the leg 11 has an outer surface which is covered with a flocking 14 and an inner surface which presses against a window pane 15 when it is closed.

Another leg 16 of the basic body 10 has a free end with a profiled region 17 which surrounds the mounting projection 6 and the fitting strip 8 of the plastic section 5, thus insuring a firm seat for the window guide section 4 on that side as well. A sealing strip 18 which is also connected in the region 17, presses against the underside of a roof 19, which is shown in broken lines, when the door is closed. Additionally, a profiled or fitting strip or projection 20 on the underside of the profiled region 17 surrounds the window pane in the door from the top and the outside and can additionally be connected to the basic body 10 by means of a web 21, in order to ensure that the projection 20 folds inwardly and presses against the window pane 15 when the window pane 15 is closed. Therefore, elements 10–13 and 16–18 provide the mounting of the window guide section 4.

On the inside of the metal frame 1, the metal frame or the plastic section 5 are sealed in the conventional manner by means of a hollow section 26 which is slipped over a cut-out flange 25 on the door. The hollow section 26 is also only shown in broken lines since it contributes nothing to the actual invention.

It is seen from the illustrated embodiment that the simple feature of a plastic section surrounding the metal frame has produced an interposed intermediate system which on one hand permits a compensation of variations in manufacturing tolerances of the metal frame, for example with regard to the length of the webs 2 and 3, their angles of aperture or the geometry of the hollow profiled region, while at the same time it allows the actual window guide section 4 to be mounted in a simple manner .so that the window is always securely sealed from the outside and can always be brought correctly into the proper position.

I claim:

1. In a motor vehicle door having a metal frame with a rear surface and two outwardly-projecting webs with free ends, and a window guide section with recesses of a given shape formed therein, a configuration for fixing the window guide section to the metal frame, comprising a rigid plastic section surrounding the rear surface of the metal frame, said plastic section extending beyond the free ends of the webs and at least partially surrounding the webs at a given location, and said plastic section having laterally-projecting mounting projections with the given shape in the vicinity of said given location being buttoned into the recesses in the window guide section.

2. The configuration according to claim 1, wherein said plastic section is formed of ABS.

3. The configuration according to claim 2, wherein said plastic section is reinforced with fiberglass.

4. The configuration according to claim 1, wherein said plastic section is formed of polyamide.

5. The configuration according to claim 1, wherein said plastic section has an approximately U-shaped cross-section with legs having free ends, said mounting projections being disposed on said free ends of said legs.

6. The configuration according to claim 5, wherein said mounting projections include an additional, outwardly-projecting strip disposed on said free end of at least one of said legs.

7. The configuration according to claim 1, wherein the motor vehicle has a roof with a lower surface, the door has a window pane, the window guide section has an approximately U-shaped basic body having legs with free ends, said basic body is disposed between the webs of the metal frame, said free end of one of said legs has an outwardly projecting strip surrounding one of said mounting projections of said plastic section and a sealing lip projecting inwardly at an angle towards the window pane, and said free end of the other of said legs has a profile region surrounding the other of said mounting projections and a sealing strip pressing against the lower surface of the roof.

8. The configuration according to claim 7, wherein said free end of the other of said legs has a profiled strip surrounding the window pane from the top and the outside, and said profiled strip has an outer surface flush with said sealing strip.

9. The configuration according to claim 7, wherein the window guide section has a contraction in the vicinity of the bottom of the basic body for reducing the thickness of the window guide section.

* * * * *